United States Patent
Moon et al.

(10) Patent No.: US 7,617,231 B2
(45) Date of Patent: Nov. 10, 2009

(54) DATA HASHING METHOD, DATA PROCESSING METHOD, AND DATA PROCESSING SYSTEM USING SIMILARITY-BASED HASHING ALGORITHM

(75) Inventors: Hwa Shin Moon, Daejeon (KR); Sungwon Yi, Seoul (KR); Jintae Oh, Daejeon (KR); Jong Soo Jang, Daejeon (KR); Changhoon Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 11/634,731

(22) Filed: Dec. 6, 2006

(65) Prior Publication Data

US 2007/0130188 A1    Jun. 7, 2007

(30) Foreign Application Priority Data

Dec. 7, 2005    (KR) ............... 10-2005-0119074
Jul. 7, 2006    (KR) ............... 10-2006-0064012

(51) Int. Cl.
*G06F 17/00*    (2006.01)
(52) U.S. Cl. ............... 707/101; 707/102; 707/103 Z; 707/104.1
(58) Field of Classification Search ............... 707/3, 707/101, 200, 100; 717/116; 713/176, 181; 382/124
See application file for complete search history.

(56) References Cited

U.S. PATENT DOCUMENTS

| 6,240,409 | B1 | 5/2001 | Aiken | |
|---|---|---|---|---|
| 6,941,003 | B2* | 9/2005 | Ziesig | 382/124 |
| 2003/0191764 | A1* | 10/2003 | Richards | 707/100 |
| 2004/0010691 | A1* | 1/2004 | Nelson | 713/176 |
| 2004/0125799 | A1 | 7/2004 | Buer | |
| 2005/0273617 | A1* | 12/2005 | Mihcak et al. | 713/181 |
| 2006/0041597 | A1* | 2/2006 | Conrad et al. | 707/200 |

(Continued)

FOREIGN PATENT DOCUMENTS

GB    2419434    4/2006

(Continued)

OTHER PUBLICATIONS

Daniel Fogaras et al., "Scaling link-based similarity search", ACM, May 2005, pp. 641-650.*

(Continued)

*Primary Examiner*—Thuy N Pardo
(74) *Attorney, Agent, or Firm*—Ladas & Parry LLP

(57) ABSTRACT

A data hashing method, a data processing method, and a data processing system using a similarity-based hashing (SBH) algorithm in which the same hash value is calculated for the same data and the more similar data, the smaller difference in the generated hash values. The data hashing method includes receiving computerized data, and generating a hash value of the computerized data using the SBH algorithm in which two data are the same if calculated hash values are the same and two data are similar if the difference of calculated hash values is small, wherein a search, comparison, and classification of data may be quickly processed within a time complexity of O(1) or O(n) since the similarity/closeness of data content are quantified by component values for each of the respective corresponding generated hash values.

23 Claims, 6 Drawing Sheets

U.S. PATENT DOCUMENTS

2006/0150153 A1* 7/2006 Altman .................. 717/116
2006/0235895 A1* 10/2006 Rodriguez et al. ......... 707/200
2007/0038659 A1* 2/2007 Datar et al. ............. 707/101
2008/0140616 A1* 6/2008 Encina et al. ............ 707/3

FOREIGN PATENT DOCUMENTS

KR    10-2003-003576    5/2003

OTHER PUBLICATIONS

James W. Cooper et al., "Detecting similar documents using salient terms", IBM, 2002, pp. 245-251.*
Jack G. Conrad et al., "Online Duplicate Document Detection: Signature Reliability in a Dynamic Retrieval Environment", ACM, Nov. 2003, pp. 443-452.*
Manber, U., "Finding Similar Files in a Large File System." 2003. *University of Arizona, Tucon, AZ, Department of Computer Science.*

* cited by examiner

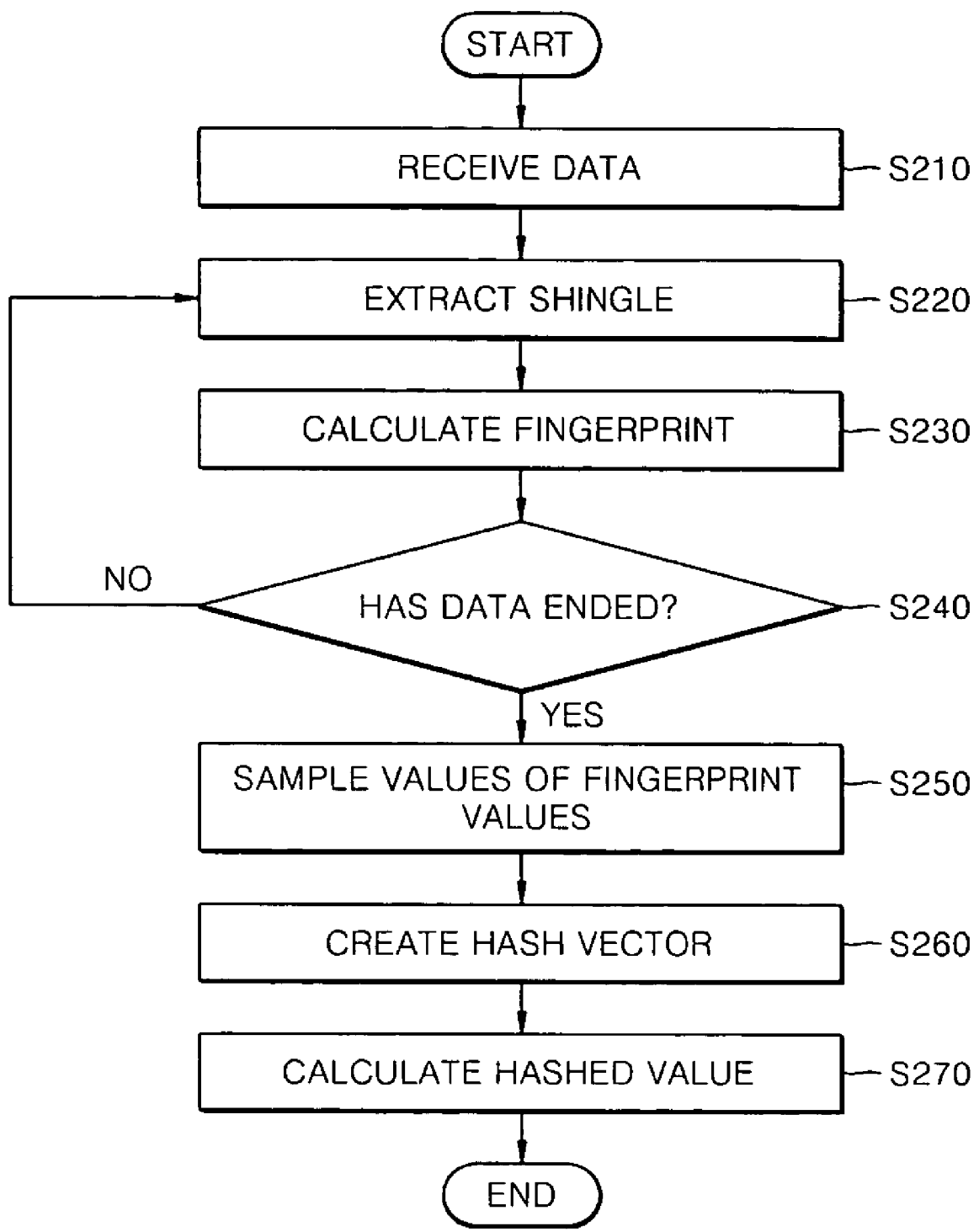

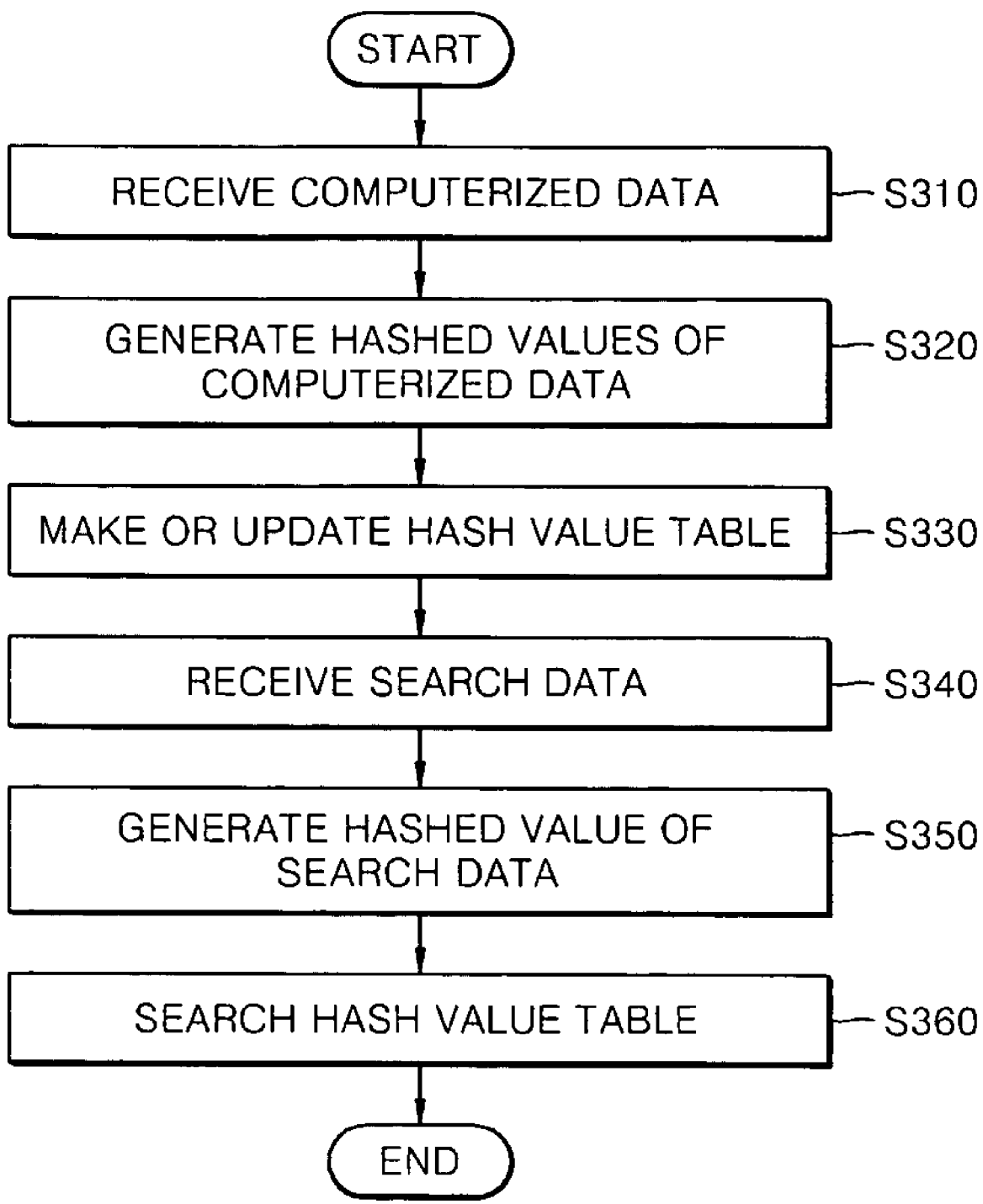

DATA HASHING METHOD, DATA PROCESSING METHOD, AND DATA PROCESSING SYSTEM USING SIMILARITY-BASED HASHING ALGORITHM

CROSS-REFERENCE TO RELATED PATENT APPLICATION

This application claims the benefits of Korean Patent Application No. 10-2005-0119074 filed on Dec. 7, 2005, and Korean Patent Application No. 10-2006-0064012, filed on Jul. 7, 2006, in the Korean Intellectual Property Office, the disclosures of which are incorporated herein in their entirety by reference.

BACKGROUND OF THE INVENTION

1. Field of the Invention

The present invention relates to managing/processing electronic documents or computerized data and, more particularly, to a data hashing method and a data processing system with such a method for storing, searching and clustering large data content using simple numeric values.

The present invention relates to electronic documents or computerized data processing, and more particularly, to a data hashing method for describing the data content using simple numeric values, and a data processing method and system using the hashing method.

2. Description of the Related Art

There are various algorithms and techniques that have been proposed for determining or quantifying the similarity among multiple electronic documents or computerized data. For example, diff tool in UNIX systems, the longest common subsequence (LCSeq) algorithm, and the longest common Substring (LCStr) algorithm are widely used techniques in practice.

For convenience of description, the aforementioned techniques are called Legacy Comparison (LEG-CMP) Algorithms hereafter.

The performance of such techniques, generally, can be evaluated by considering following well-known problems.

<Topic 1: Given n Items, Classify Items Based on Similarity>

When a LEG-CMP algorithm is used, since all the data must be compared to each other, the LEG-CMP algorithm must be performed N×(N−1)/2 times. Therefore, the time for classifying all the data, exponentially increases as the number of item (N) increases.

<Topic 2: Given a Data Item (P) and a Set of Data (X), Find Similar Data to P>

When a LEG-CMP algorithm is used, since the data P must be compared to all individual data included in the data set X, the LEG-CMP algorithm must be performed according to the size of the data set X, i.e., the amount of data included in the data set X. Since the data item, P, has to be compared against all the other data in the set x, the data comparison time increases as the size of set (N) increases.

Therefore, the performance of the LEG-CMP algorithms can be problematic for a large number of data since all possible combinations of two data in the given set need to be directly compared to quantify the similarity of them. Unlike the LEG-CMP algorithms, such overhead can be significantly reduced when a hashing technique is used because the comparison operations are performed with simple numeric values which represent each of data item.

Conventionally, widely used data hashing schemes are Cyclic Redundancy Check (CRC), Message Digest 5 (MD5), Secure Hash Algorithm-1 (SHA-1), Exclusive OR (XOR)-Folding and Shift, etc. For convenience of description, in the present invention, the above hashing algorithms are called Exact Match-based Hashing (EXCT-HASH) algorithms. Although conventional EXCT-HASH performs well in finding the exactly same data, finding similar data can be problematic since the proximity of hash values does not imply the similarity of data with EXCT-HASH algorithms. i.e., a slight variation in the data content can result in a totally different hash value.

In summary, the previous solutions may work in solving particular problems, but they are clearly not efficient solutions in finding items with similar data content.

SUMMARY OF THE INVENTION

The present invention provides a data hashing method, a data processing method, and a data processing system using a similarity-based hashing (SBH) algorithm in the similarity/closeness of data content are quantified by that of the corresponding hash values. i.e., the more similar data content, the smaller difference in the generated hash values.

An aspect of the present invention defines a data hashing method using the SBH algorithm, wherein the data hashing method comprises receiving computerized data and generating a hash value of the computerized data using the SBH algorithm in which the same hash value is calculated for the same data and the more similar data, the smaller difference in the generated hash values.

The computerized data may be any kind of data, such as a computer file document, a packet transferred through a network, or a database query, represented with a bit string.

The generation of the hash value of the computerized data using the SBH algorithm may comprise calculating a fingerprint value from the content of the computerized data, changing a component value of an Nth-order hash vector to correspond to the fingerprint value according to a predetermined rule, determining whether the entire amount of the content of the computerized data has been processed, and if it is determined that the entire amount of the content of the computerized data has been processed, converting the Nth-order hash vector to the hash value. If it is determined that the entire amount of the content of the computerized data has not been processed, a subsequent fingerprint value may be calculated from the content of the computerized data by returning to calculating a fingerprint value.

The calculation of the fingerprint value may comprise extracting a shingle, which is a continuous or discontinuous byte-string having a predetermined length, from the computerized data, and generating a fingerprint value using a data hashing algorithm which satisfies uniformity and randomness criteria for the shingle and has a low possibility of collision. The data hashing algorithm may be a conventional hashing algorithm such as a Rabin-Karp fingerprinting algorithm, a byte-wise foldering algorithm, or an XORing algorithm.

The change of the component value of the Nth-order hash vector may comprise grouping the fingerprint value in one of N groups by applying the predetermined rule to the fingerprint value or a portion of the fingerprint value, and if the fingerprint value belongs to a certain group among the N groups, increasing the component value of the Nth-order hash vector, which corresponds to the certain group. An initial value of each component of the Nth-order hash vector may be set to a uniform or non-uniform integer, and the increase of the component value of the Nth-order hash vector may occur in the same unit for all groups or in a different unit with a different weight per group.

The data hashing method may further comprise performing consistent sampling based on the entire fingerprint value or a portion of the fingerprint value, and only the sampled fingerprint values can be used to change the component values of the Nth-order hash vector.

The generation of the hash value of the computerized data using the SBH algorithm may comprise: calculating a plurality of fingerprint values from the content of the computerized data; creating an Nth-order hash vector corresponding to the fingerprint values according to a predetermined rule, and converting the Nth-order hash vector to the hash value.

The creation of the Nth-order hash vector may comprise grouping the fingerprint values to N groups by applying the predetermined rule to the fingerprint values or a portion of the fingerprint values, and creating the Nth-order hash vector by designating the number of fingerprint values included in each of the N groups or a value obtained by weighting each of the N groups and multiplying the number by a weight as a relevant component value of the Nth-order hash vector.

The hash value may comprise a first hash value and a second hash value, wherein the first hash value is an interior angle $\theta$ or $\cos \theta$ between the Nth-order hash vector and an Nth-order base vector, and the second hash value is a distance D between an end point of the Nth-order hash vector and an end point of the Nth-order base vector or a scalar product between the Nth-order hash vector and the Nth-order base vector.

The Nth-order hash vector may be divided into m sub-hash vectors, and the hash value may comprise a first M hash value and a second M hash value, each having m components, wherein the m components of the first M hash value are respectively interior angles $\theta_i$:i=1~m between the m sub-hash vectors and m base sub-vectors, each having the same order as a corresponding sub-hash vector, or $\cos \theta_i$, and the m components of the second M hash value are respectively distances $D_i$:i=1~m between end points of the m sub-hash vectors and end points of the m base sub-vectors or scalar products between the m sub-hash vectors and the m base sub-vectors.

A sum of the orders of the m sub-hash vectors may be equal to or greater than N, or each of the m sub-hash vectors may be an Nth-order vector in which components values, except for a portion having a valid component value of the Nth-order hash vector, are 0.

A plurality of hash values, each having 2 m components, may be generated for a plurality of computerized data, and the similarity of each of the plurality of computerized data can be determined by respectively comparing components of a reference hash value having 2 m components to the 2 m components of each of the plurality of hash values, setting sub-weights inversely proportional to differences between the components, and summing all the sub-weights.

According to another aspect of the present invention, there is provided a data processing method using the SBH algorithm, wherein the data processing method comprises making a hash value table for a plurality of computerized data using the SBH algorithm, and processing the plurality of computerized data using the hash value table.

The plurality of computerized data may be processed using at least one of comparison, search, classification, change, and similarity calculation of data, and can be processed within a time complexity of O(1), which is a constant, or O(n), which is proportional to the number n of data, by using the magnitude of a difference between hash values included in the hash value table.

If the plurality of computerized data is processed in order to search for data that is the same as or similar to search data, the processing of the plurality of computerized data may comprise receiving the search data, generating a hash value of the search data using the SBH algorithm, and searching for the same or similar data by indexing the hash value in the hash value table.

When the hash value table is being made, the hash value of the plurality of computerized data may be generated, and in the searching for the same or similar data, data that is the same as or similar to the search data can be found within a predetermined hash value difference range defined by a user by comparing the hash value of the search data to hash values of the plurality of computerized data.

The plurality of computerized data may be packets transmitted through a network, and when the hash value table is being made, a hash value table for the packets is made, and during processing of the plurality of computerized data, a rapid increase of packets that are the same as or similar to a specific packet can be monitored or blocked.

According to another aspect of the present invention, there is provided a data processing system using the SBH algorithm, wherein the data processing system comprises an inputting unit to which computerized data is input; a hash value generator generating a hash value of the input computerized data using the SBH algorithm; and a data processing unit processing the computerized data using hash values.

The computerized data may be packets transmitted through a network, hash values corresponding to the packets may be listed in a hash value table, and the data processing unit can monitor or block a rapid increase of packets that are the same as or similar to a specific packet by checking whether the number of specific hash values or hash values that have a difference compared to the specific hash value within a predetermined range is greater than a threshold number.

The data processing system may be a system for monitoring or controlling an illegal distribution of a digitized original document protected by copyright or a document management system performing at least one of comparison, search, tracking, and classification functions for the plurality of documents, such as a concurrent versions system (CVS) which a plurality of users can use simultaneously.

The data processing system may further comprise a data comparison and search unit using a same data comparison algorithm, wherein the data processing unit can use the SBH algorithm for a quick search for the same or similar data, and the same data comparison algorithm can be used for a detailed comparison of the found same or similar data.

The same data comparison algorithm may be a Legacy Comparison (LEG-CMP) algorithm comprising one of a diff tool, a Longest Common Subsequence (LCSeq) algorithm, and a Longest Common Substring (LCStr) algorithm.

BRIEF DESCRIPTION OF THE DRAWINGS

The above and other features and advantages of the present invention will become more apparent by describing in detail exemplary embodiments thereof with reference to the attached drawings in which:

FIG. 1B is a flowchart illustrating a hash value generation process in a hashing method according to another embodiment of the present invention;

FIG. 3A is a flowchart illustrating a data search process in a data processing method according to an embodiment of the present invention;

DETAILED DESCRIPTION OF THE INVENTION

Figure 1A:
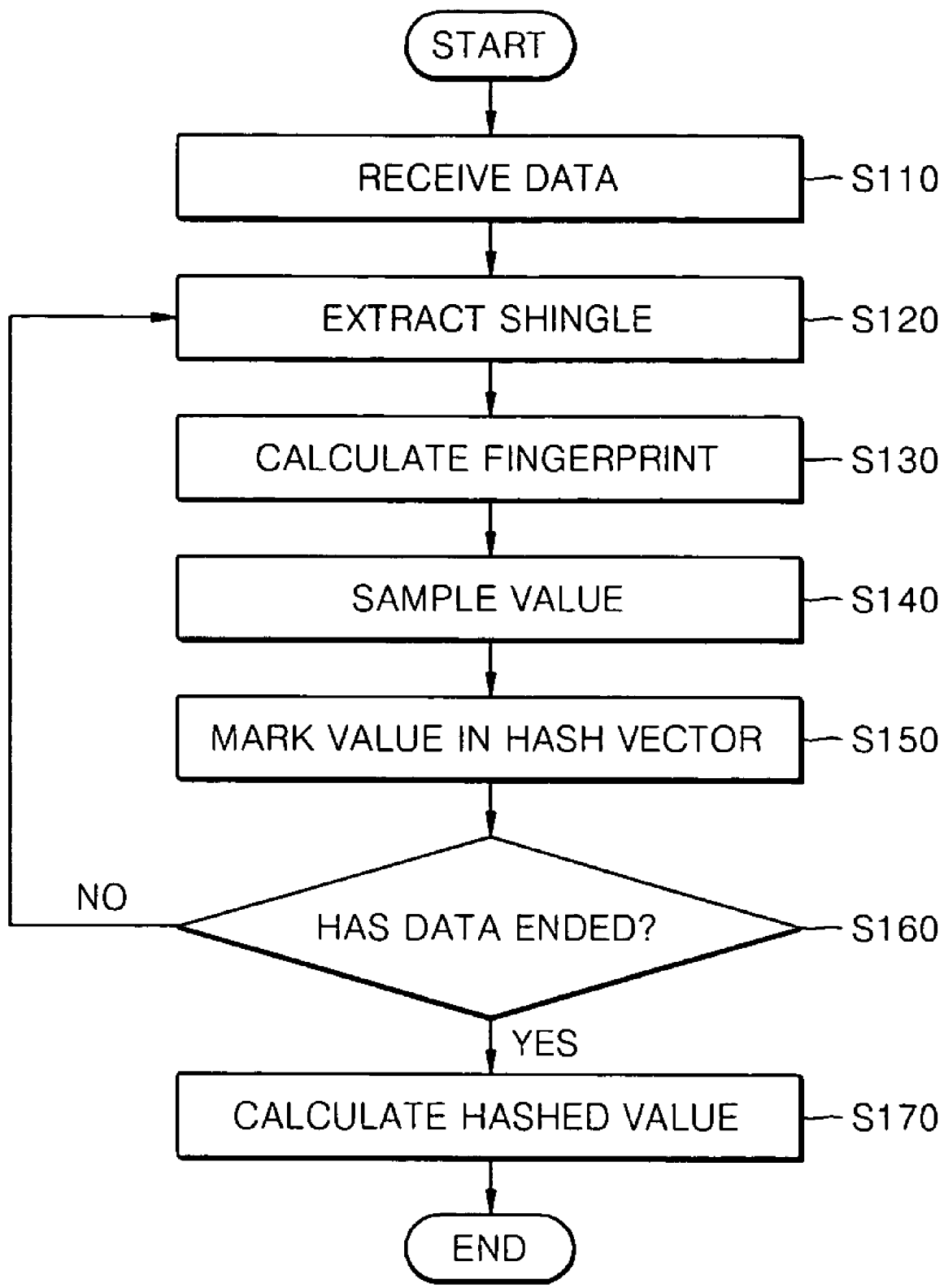
FIG. 1A is a flowchart illustrating a hash value generation process in a hashing method according to an embodiment of the present invention.

The present invention will now be described more fully with reference to the accompanying drawings, in which exemplary embodiments of the invention are shown. In the drawings, the thicknesses of layers and regions are exaggerated for clarity. Like reference numerals in the drawings denote like elements, and thus their description will be omitted. However, the terminology described below is defined considering functions in the present invention and may vary according to a user or play of application. Thus, the definitions should be understood based on all the content of the specification.

In the present invention, problems of the prior art are solved using a hashing method in which the content of data can be described as a simple numeric value. According to the hashing method, the same hash value is calculated for the same data and hash values for two similar items of data are calculated so that a difference between the hash values is smaller in proportion to the similarity of the two similar items of data. Thus, when the content of the two similar items of data are compared to each other, data similarity can be easily determined by hashing the two similar items of data and obtaining a difference between the hash values. For convenience of description, it is assumed that a hashing algorithm suggested in the present invention is a similarity-based hashing (SBH) algorithm.

The effect of performance improvement, which can be obtained using the SBH algorithm, will now be described with respect to the two above-described topics.

<Topic 1: Classify N Items of Data Based on Similarity>

Data information is recorded at a relevant location in a hash value table by hashing each of the N items of data using the SBH algorithm and designating the hash value as an address. If the hashing process is completed for the N items of data, data hash in similar locations may be grouped by sequentially searching the hash value table. In this case, the topic can be solved by hashing each of the N items of data and sequentially searching the hash value table once after the hashing process is completed. Thus, the topic can be solved in a linear time.

<Topic 2: Find Data Similar to Certain Data P in a Data Set X Composed of a Plurality of Data>

Initially, data information is recorded at relevant locations in a hash value table by hashing all data in the data set X using the SBH algorithm and designating the hash values as addresses in the same manner as performed in topic 1. When the data P is input, data similar to the data P in the data set X can be found by hashing the data P and detecting an entry corresponding to the hash value of the data P, or the entry and entries adjacent to the entry, from the hash value table. If the initial operation for hashing all the data in the data set X is considered as a fixed processing time, a processing time required every time each data is input is a time for processing a hash value only once using the SBH algorithm.

According to the SBH algorithm suggested for use in the present invention, the same hash value is calculated for the same data and hash values for two similar items of data are calculated so that the difference between the hash values is smaller in proportion to the similarity of the two similar items of data.

The suggested hashing method is performed by extracting a plurality of fingerprint values from the data content, marking numbers of fingerprint values in a vector by designating the fingerprint values as addresses, and digitizing a characteristic of the vector.

FIG. 1A is a flowchart illustrating a hash value generation process in a hashing method according to an embodiment of the present invention.

Referring to FIG. 1, data that is to have a hash value thereof calculated is input in operation S110. Here, in order to input the data, any computerized input method including a method of directly inputting the data using a computer keyboard, a method of inputting the data over the Internet, a method of reading the data from a storage medium, etc. can be used.

A shingle having a predetermined length is extracted from the input data in operation S120. The shingle is a continuous or discontinuous byte-string having a predetermined length. Although the length of the shingle can be set differently according to the attributes of the data and a hashing application field, the same length must be used in the same comparison group.

Fingerprint values of the extracted shingle are calculated in operation S130 using a simple, widely used hashing algorithm. Examples of the hashing algorithm are a Rabin-Karp fingerprinting algorithm, a byte-wise foldering algorithm, and an XORing algorithm.

The calculated fingerprint values are sampled based on a predetermined rule in operation S140. If only fingerprint values in which values of 4 least significant bits are 0 are used in an SBH algorithm, $1/16$ of a byte shingle is generally sampled. This operation is called a value sampling process. However, the value sampling process is not a prerequisite of the current embodiment. Thus, the value sampling process is used when a user wants to emphasize data corresponding to interests of the user according to a characteristic of a system, and a sampling scheme to be used can also be determined according to system characteristics.

A value is marked in a hash vector by designating a sampled fingerprint value or a portion, e.g., the least significant byte, of the sampled fingerprint value as an address in operation S150. The marking of the value in the hash vector is achieved by increasing component values in an Nth-order hash vector, which is initialized in an initial hashing stage, according to a predetermined rule.

The hash vector can be initialized with uniform or non-uniform integer values. The increase of the component values can be achieved by increasing all component values in the same unit or weighting the component values differently in order to increase the component values in different units. Several methods can be employed as the predetermined rule. One of them is a method of creating a hash vector by dividing each fingerprint value by N and designating a residue as each component of an Nth-order hash vector. Thus, a plurality of fingerprint values are grouped to make N groups, and the number of fingerprint values included in each group corresponds to each component of the hash vector. As described above, by increasing a reflection ratio of fingerprint values of an important part in the hash vector, i.e., by setting different initial values for the fingerprint values of the important part or increasing the degree by which the fingerprint values are raised of the fingerprint values of the important part, the importance of the important part can be set higher than other parts even in a hash value comparison process.

After the vector marking process is finished, it is determined in operation S160 whether the data has been completely processed, i.e., whether all shingles have been extracted from the data. If it is determined that content of the data to be processed remain, a subsequent shingle is extracted in operation S120. The above-described procedures are performed until all shingles are extracted from the data. Here, each shingle is extracted by a sliding window method in which the data is slid by a predetermined unit from the first item of data to the last.

After all shingles are processed, a hash value is calculated using a finally created hash vector in operation S170. The hash value generation process will be described in more detail with reference to FIGS. 2A through 3B.

FIG. 1B is a flowchart illustrating a hash value generation process in a hashing method according to another embodiment of the present invention.

The process illustrated in FIG. 1B has slightly different procedures compared to those of the process illustrated in FIG. 1A, but produces the same results. That is, compared to the embodiment of FIG. 1A in which a hash vector is continuously changed every time each shingle is extracted, in the current embodiment, fingerprint values of all extracted shingles are calculated in operations S220 through S240, the calculated fingerprint values are sampled all at the same time in operation S250, and a hash vector is created all at the same time in operation S260. In the current embodiment, a memory space may be needed to store the fingerprint values of all the extracted shingles. A data input process (operation S210) and a hash value calculation process (operation S270) are the same as described in the embodiment of FIG. 1A.

Figure 2A:
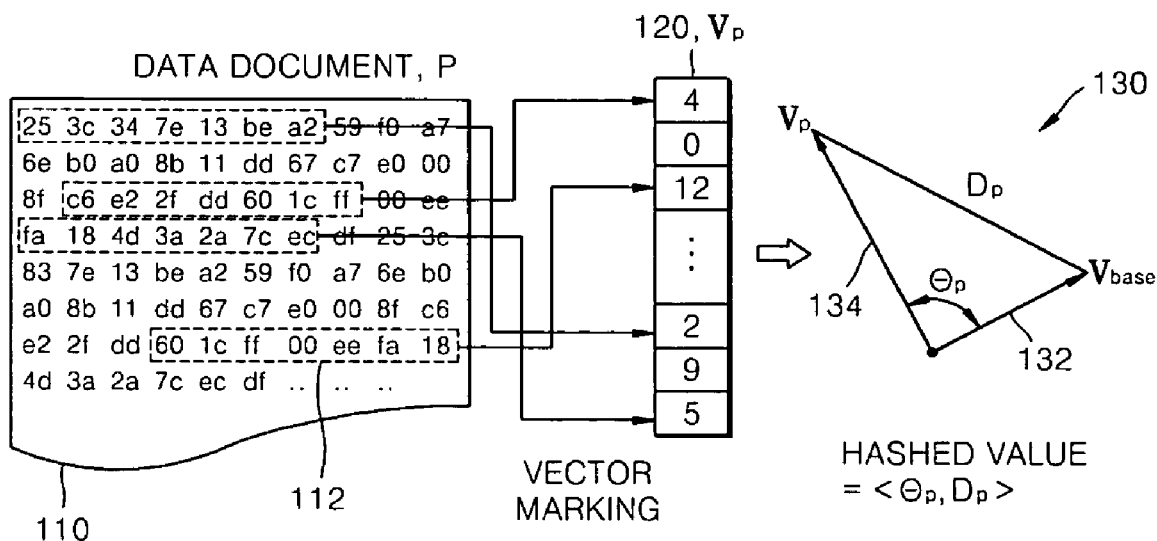
FIG. 2A illustrates in more detail the hash value generation process illustrated in FIG. 1A or 1B.

FIG. 2A illustrates in more detail the hash value generation process illustrated in FIG. 1A or 1B.

Referring to FIG. 2A, fingerprint values of each byte shingle 112 included in a data document P 110 are calculated, a portion of the calculated fingerprint values are sampled, the sampled fingerprint values are grouped into N groups according to a predetermined rule, and the number of sampled fingerprint values included in each group is counted and marked in a hash arrangement $V_P$ 120. In this case, the hash arrangement is an Nth-order arrangement, i.e., the number of components of the hash arrangement is N. Thus, an Nth-order hash vector $V_P$ 134, in which numbers marked in the vector arrangement are component values, can be defined.

In a vector triangle 130 using the created Nth-order hash vector $V_P$ 134 and an arbitrary Nth-order base vector $V_{Base}$ 132, an interior angle $\theta_P$ between the Nth-order hash vector $V_P$ 134 and the Nth-order base vector $V_{Base}$ 132 and a distance $D_P$ between the end point of the Nth-order hash vector $V_P$ 134 and the end point of the Nth-order base vector $V_{Base}$ 132 can be calculated using Equations 1 through 3.

$$\cos(\theta_P) = V_P \cdot V_{Base}/|V_P||V_{Base}| \quad (1)$$

$$\theta_P = \cos^{-1}(V_P \cdot V_{Base}/|V_P||V_{Base}|) \quad (2)$$

$$D_P = |V_P - V_{Base}| \quad (3)$$

The interior angle $\theta_P$ and the distance $D_P$ form a hash value of the content of the data document P 110. In a system which does not allow the calculation of the interior angle $\theta_P$, $\cos(\theta_P)$ can be used as a reference instead of $\theta_P$. In addition, a value obtained by projecting the Nth-order hash vector $V_P$ 134 onto the Nth-order base vector $V_{Base}$ 132, i.e., a scalar product ($V_P \cdot V_{Base}$) of the two vectors $V_P$ 134 and $V_{Base}$ 132, can be used instead of the distance $D_P$. Thus, a hash value has two components and can be represented using a plurality of sets. One of the sets can be selected and used as a hash value for determining data similarity.

When the hash arrangement $V_P$ 120 is defined as a single Nth-order hash vector, if the interior angle $\theta_P$ and the distance $D_P$ are calculated in a state where the amount of data to be compared is very large, the probability of collision between hash values increases. In this case, a multi-stage hashing scheme may be employed to decrease the hash collision probability by using more than two hash vectors independent on each other at the same time.

Figure 2B:
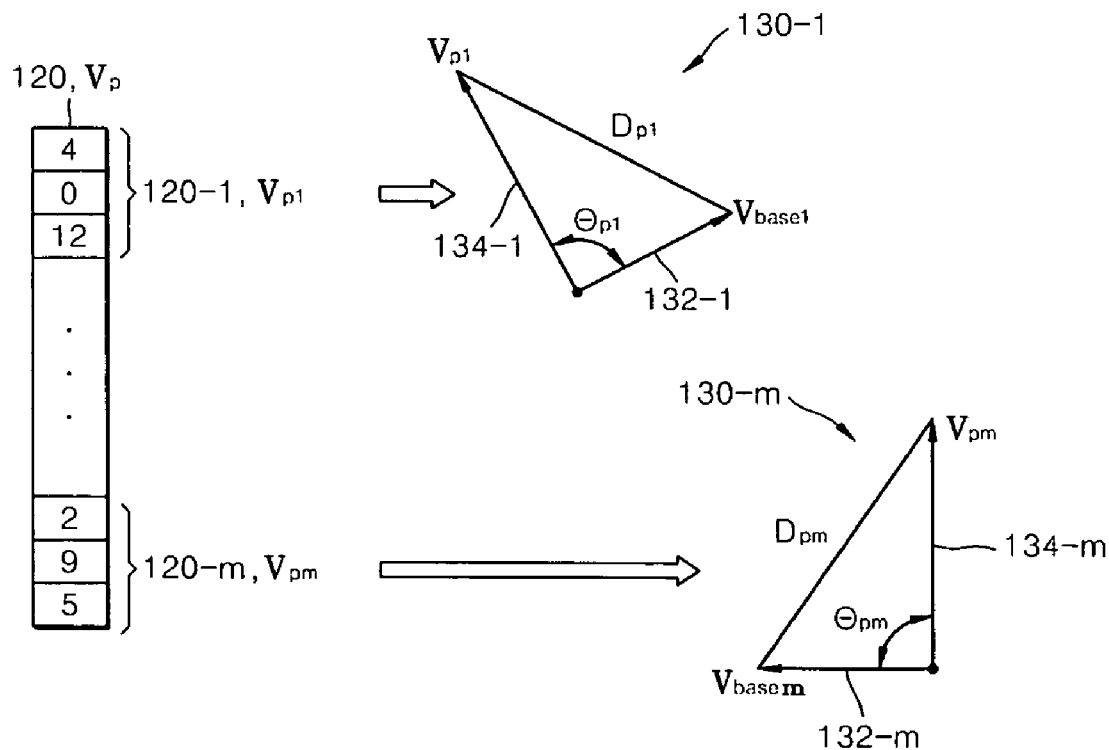
FIG. 2B is a diagram for explaining a method of generating a hash value using a multi-stage hashing scheme according to an embodiment of the present invention.

FIG. 2B is a diagram for explaining a method of generating a hash value using a multi-stage hashing scheme according to an embodiment of the present invention.

The embodiment of FIG. 2B employs a hash vector according to another concept although the embodiment of FIG. 2B employs the same process of obtaining the hash arrangement $V_P$ 120 as illustrated in FIG. 2A. That is, without defining the entire hash arrangement $V_P$ 120 as a single hash vector, the hash arrangement $V_P$ 120 is divided into m sub-hash arrangements 120-1, through to 120-m, and sub-hash vectors 134-1, through to 134-m corresponding to the sub-hash arrangements 120-1, through to 120-m are defined. By doing this, the performance of the SBH algorithm can be increased.

In more detail, the hash arrangement $V_P$ 120 on which fingerprint values of shingles are reflected is not considered as a single Nth-order hash vector but divided into m (m>=2) sub-hash vectors $V_{P1}$, through to $V_{Pm}$ 134-1, through to 134-m and processed. The order of each of the sub-hash vectors $V_{P1}$, through to $V_{Pm}$ 134-1, through to 134-m is a positive integer less than N, and a sum of the orders of the sub-hash vectors $V_{P1}$, through to $V_{Pm}$ 134-1, through to 134-m is a positive integer equal to or greater than N. The sub-hash vectors $V_{P1}$, through to $V_{Pm}$ 134-1, through to 134-m are respectively compared to base vectors $V_{Base1}$, through to $V_{Basem}$ 132-1, through to 132-m matched to each order of the sub-hash vectors $V_{P1}$, through to $V_{Pm}$ 134-1, through to 134-m, and as a result, interior angles $\theta_{P1}$, through to $\theta_{Pm}$ and distances $D_{P1}$, through to $D_{Pm}$ between end points are calculated.

When hash values of two data are compared to each other in order to check the similarity of the two data, if m interior angles $\theta_{P1}$, through to $\theta_{Pm}$ and m distances $D_{P1}$, through to $D_{Pm}$ between end points are respectively all the same, the two data are the same, and if a portion of the m interior angles $\theta_{P1}$, through to $\theta_{Pm}$ and m distances $D_{P1}$, through to $D_{Pm}$ between the end points are respectively the same and the others are respectively similar to each other within a pre-set range, the two data are similar to each other. In this case, $\cos(\theta_P)$ values and scalar product values of vectors can be used instead of the interior angle values and the distance values between the end points.

Each sub-hash vector can be defined as an Nth-order vector in which only components related to the sub-hash vector have valid values and the other components have values equal to 0.

FIG. 3A is a flowchart illustrating a data search process in a data processing method according to an embodiment of the present invention.

Referring to FIG. 3A, computerized data are input in operation S310. Here, in order to input the computerized data, any computerized input method including a method of directly inputting the data using a computer keyboard, a method of inputting the data over the Internet, a method of reading the data from a storage medium, etc. can be used as described above.

Hash values of the computerized data are calculated using an SBH algorithm in operation S320 and listed in a hash value table in operation S330.

Thereafter, data needed to perform a similarity search is input in operation S340, and a hash value of the data needed to perform a similarity search is calculated using the SBH algorithm in operation S350. Then, the same or similar data is searched for by comparing the hash value of the data needed to perform a similarity search to each of the hash values listed in the hash value table in operation S360.

Figure 3B:
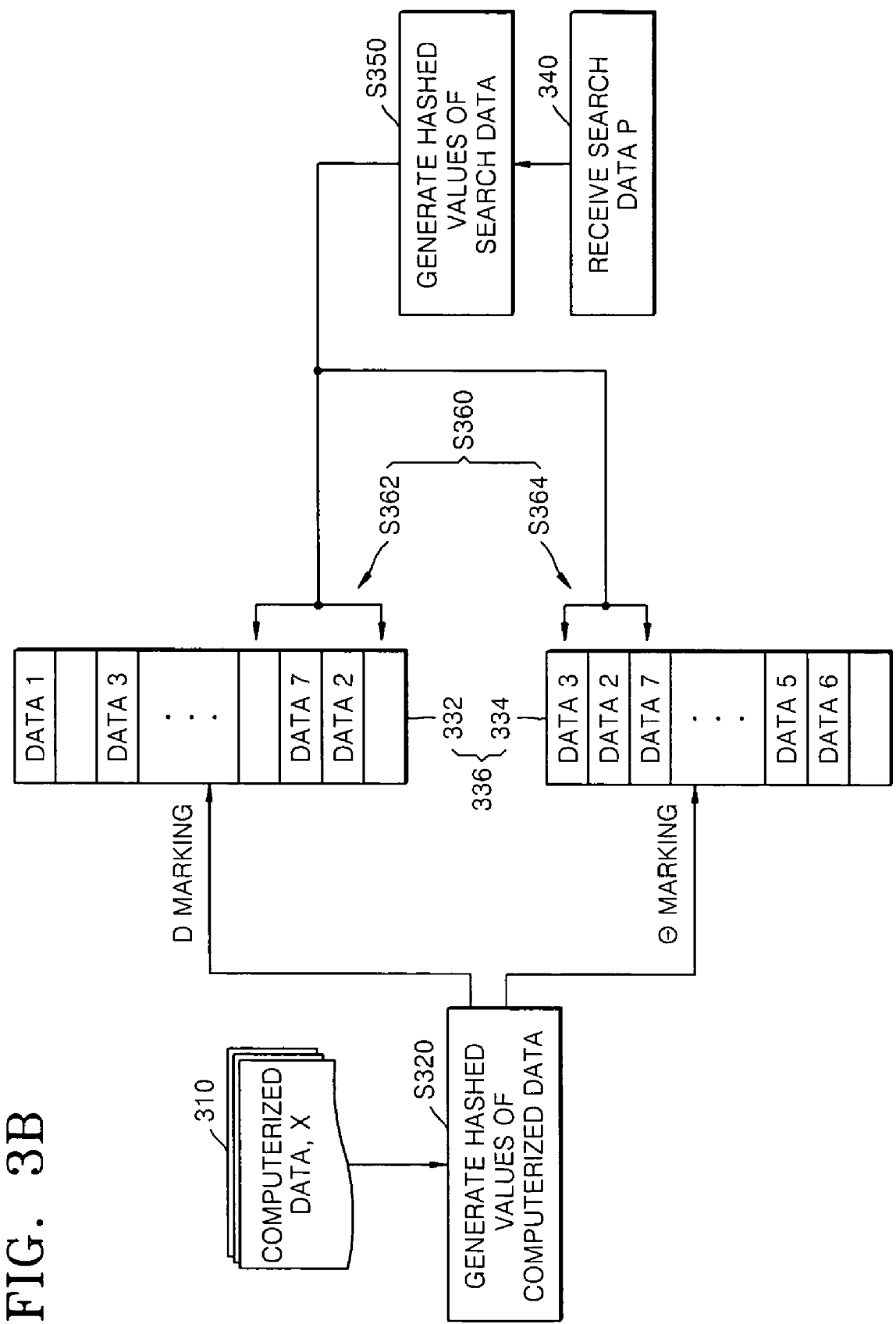
FIG. 3B is a block diagram for explaining in more detail the data search process shown in FIG. 3A, according to an embodiment of the present invention.

FIG. 3B is a block diagram for explaining in more detail the data search process shown in FIG. 3A, according to an embodiment of the present invention, wherein a method of searching for data P 340 (hereinafter, search data) to be searched for and data similar to the search data in a computerized data set X 310 within a linear time is described.

Referring to FIG. 3B, the data search process includes an initialization process for initializing the computerized data set X 310 and a search process for calculating a hash value of the input search data P 340 and searching for similar data using the calculated hash value.

In the initialization process, a hash value, i.e., an interior angle $\theta$ or a cos $\theta$ and a distance D between end points or a scalar product of a hash vector, of each data item included in the computerized data set X 310 is calculated using the SBH algorithm described above in operation S320. Herein, the computerized data set X 310 can be, for example, an electronic document set. By designating each calculated interior angle $\theta$ and distance D between end points as an address, the hash values are marked in separate hash value tables 336, i.e., a $\theta$ table 334 and a D table 332, or a relevant entry is updated. The updated entry can indicate, for example, that new hash values are marked in the hash value tables 336 when new data to be searched is input, or that hash values are deleted from the hash value tables 336 when existing data to be searched is deleted. However, in the present invention, the updated entry is not limited to the above examples.

Finally, the content of all the data to be searched are stored in the $\theta$ table 334 and the D table 332. The $\theta$ table 334 and the D table 332 of the hash value tables 336 are arranged according to a predetermined rule, and thus, the similarity of data is determined by comparing the hash value of the search data P 340 to hash values in the $\theta$ table 334 and the D table 332 and determining by how much the hash value of the search data P 340 differs from each of the hash values in the $\theta$ table 334 and the D table 332 as the comparison result.

In the search process, a hash value of the input search data P 340 is calculated using the SBH algorithm in operation S350. That is, an interior angle $\theta$ and distance D between end points of the input search data P 340 are calculated. The $\theta$ table 334 and the D table 332 are indexed by designating the hash value as an address in operation S360. Here, data stored at the indexed address or data stored at addresses adjacent to the indexed address is document(s) the same as or similar to the search data P 340. That is, hash values of data having small differences from the input search data P 340 are placed near to the location of the hash value of the input search data P 340, and thus the similarity increases more if the hash values are nearer to the hash value of the input search data P 340. In FIG. 3B, data most similar to the search data P 340 is 'data 7', and data second most similar to the search data P 340 is 'data 2'.

If the multi-stage hashing scheme is used, a $\theta$ table and a D table can exist for each sub-hash vector. In particular, if m sub-hash vectors are used, a plurality of hash values, each having 2 m components, are generated with respect to a plurality of computerized data, and each of the plurality of hash values can be stored in a $\theta$ table and a D table corresponding to each component. When search data is input, the search data has a hash value having 2 m components, and data having the hash value of the search data or data having values within a predetermined range of the hash value of the search data can be found from $\theta$ tables and D tables corresponding to the 2 m components. Here, the similarity between the search data and the data to be searched is determined by summing similarities calculated using the $\theta$ tables and D tables corresponding to sub-hash vectors. The similarity calculated using each table has the greatest value if the table has the same entry as the search data and has a smaller value if the table has entries farther from the search data. In addition, when the similarities calculated using the $\theta$ tables and D tables are summed together, a different weight can be applied to the similarity calculated using each table. This weight can be determined according to the hash value of the search data.

When similar data is searched for, a reference corresponding to a difference from the hash value of the search data P 340 must be set before the search process starts, in order to determine whether data to be searched is similar to the search data P 340. In addition, as described above, when data included in the data set X 310 is changed, the hash value table can be updated by adding or deleting only information on the changed data.

Figure 4:
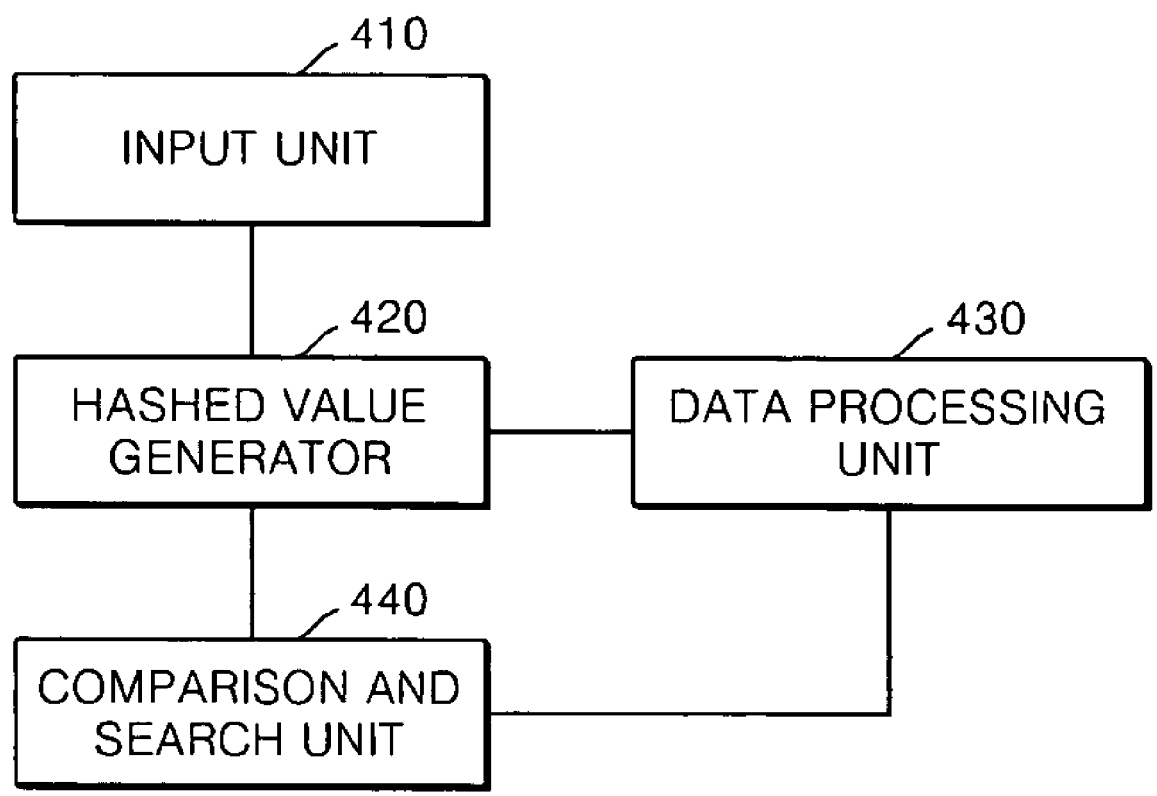
FIG. 4 is a schematic block diagram of a data processing system according to an embodiment of the present invention.

FIG. 4 is a schematic block diagram of a data processing system according to an embodiment of the present invention.

Referring to FIG. 4, the data processing system includes an input unit 410 to which computerized data is input, a hash value generator 420 generating a hash value of the input computerized data using an SBH algorithm, and a data processing unit 430 processing the computerized data using hash values. The data input to the input unit 410 may be any kind of computerized data such as data read from a storage medium and data downloaded from the Internet as described above. In addition, the data processing system can further include a comparison and search unit 440 in which the same data comparison algorithm is used.

The hash value generator 420 calculates a hash value using the SBH algorithm as illustrated in FIG. 1A or 1B. The data processing unit 430 processes data of which hash values are calculated, by performing search, comparison, classification, change, and similarity calculation of the data. The comparison and search unit 440 searches for the same documents using a same data comparison algorithm such as a diff tool, Longest Common Subsequence (LCSeq), or Longest Common Substring (LCStr) algorithm.

Implementation examples of the data processing system may be a security system, a digital copyright monitoring system, and a general-use document management system. Each of these systems will be described in detail.

When a security system for monitoring whether similar packets are abnormally and rapidly increased is realized in a data communication line in which hundreds of thousands of packets per second are carried, if the conventional LEG-CMP algorithm is used, a time complexity proportional to a square of the number of packets to be processed is required. However, if an SBH algorithm as suggested in the present invention is used, the rapid increase of similar packets can be monitored and blocked by hashing each packet and checking a specific component value increasing by more than a threshold number in a hash value table. In this case, a time complexity proportional to the number of packets to be processed is required. When the conventional Exact Match-based Hashing (EXCT-HASH) algorithm is used, the same processing performance as the SBH algorithm can be expected, but since only packets that are exactly the same can be detected, good performance cannot be expected for worm viruses or spam spread while only a portion of the content is changed.

According to the attributes of digital documents, it is very easy to change a portion of a digital document and illegally distribute the changed digital document. In a peer-to-peer (P2P) service or a web hard service by which many documents are distributed, a digital copyright monitoring system for monitoring and controlling the transmission of illegal documents similar to an original document protected by copyright is required. In order to realize the digital copyright monitoring system, by using the SBH algorithm instead of the conventional Legacy Comparison (LEG-CMP) or EXCT-HASH algorithm, high-speed processing and effective monitoring and controlling can be performed. That is, if the conventional EXCT-HASH algorithm is used, high-speed processing can be performed but, since only documents that are exactly the same can be monitored or controlled, the conventional EXCT-HASH algorithm is not robust to even minor alterations. If the SBH algorithm is used, since a user can define a level of similarity, documents similar to an original document can be effectively monitored or controlled even if the similar documents have been altered to a predetermined level.

In a document management system, such as a personal or group document management system, having a plurality of documents and performing at least one of comparison, search, tracking, and classification functions for the plurality of documents, a similarity-based search function is very important. For example, in a concurrent versions system (CVS) which a plurality of users use together, classifying and searching similar documents at high speed is frequently required. The SBH algorithm can be effectively used to realize the document management system. In addition, even in a system requiring a complicated algorithm, such as the conventional LEG-CMP algorithm, in order to correctly determine similarity, by quickly selecting similar documents from among documents to be compared using the SBH algorithm and using the complicated algorithm, i.e., the conventional LEG-CMP algorithm, for only the selected documents, a system having better performance can be provided. If the conventional EXCT-HASH algorithm is used, high-speed processing can be performed but, since a hash value does not contain a similarity, the conventional EXCT-HASH algorithm may miss many similar documents.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. In addition, the method of the invention can be implemented in a hardware manner, e.g., an application-specific integrated circuit (ASIC) or a field-programmable gate array (FPGA), and used as a part of a computing device.

As described above, according to the present invention, a search, comparison, and classification of data can be quickly processed within a time complexity of O(1) or O(n) since the similarity/closeness of data content are quantified by that of the corresponding hash values.

Thus, by applying the data hashing method to systems such as a security system, a digital copyright monitoring system, and a general-use document management system, performance of the systems can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data hashing method using a similarity-based hashing (SBH) algorithm, the data hashing method comprising:
   receiving computerized data; and
   generating a hash value of the computerized data using the SBH algorithm in which two data are the same if calculated hash values are the same and two data are similar if the difference of calculated hash values is small,
   wherein the hash value has at least two variable values that allows for a quick search of the computerized data for determining if the two data are similar, wherein the generating of the hash value of the computerized data using the SBH algorithm comprises:
   calculating a fingerprint value from the content of the computerized data;
   changing a component value of an Nth-order hash vector to correspond to the fingerprint value according to a predetermined rule;
   determining whether the entire amount of the content of the computerized data has been processed; and
   if it is determined that the entire amount of the content of the computerized data has been processed, converting the Nth-order hash vector to the hash value, and
   wherein the calculating of the fingerprint value comprises:
   extracting a shingle, which is a continuous or discontinuous byte-string having a predetermined length, from the computerized data; and
   generating a fingerprint value using a data hashing algorithm which satisfies uniformity and randomness criteria for the shingle and has a low possibility of collision.

2. The data hashing method of claim 1, wherein the computerized data is one of the group consisting of a computer file document, a packet transferred through a network, and a database query, represented with a bit string.

3. The data hashing method of claim 1, wherein if it is determined that the entire amount of the content of the computerized data has not been processed, a subsequent fingerprint value is calculated from the content of the computerized data by returning to the calculating of a fingerprint value.

4. The data hashing method of claim 1, wherein the data hashing algorithm is one of a Rabin-Karp fingerprinting algorithm, a byte-wise foldering algorithm, and an XORing algorithm.

5. The data hashing method of claim 1, wherein the changing of the component value of the Nth-order hash vector comprises:
   grouping the fingerprint value in one of N groups by applying the predetermined rule to the fingerprint value or a portion of the fingerprint value; and
   if the fingerprint value belongs to a certain group among the N groups, increasing a component value of the Nth-order hash vector, which corresponds to the certain group.

6. The data hashing method of claim 5, wherein an initial value of each component of the Nth-order hash vector is set to a uniform or non-uniform integer, and
   the increasing of the component value of the Nth-order hash vector occurs in the same unit for all groups or in a different unit with a different weight per group.

7. The data hashing method of claim 1, further comprising, before the changing of the component value of the Nth-order hash vector, performing a sampling based on the entire fingerprint value or a portion of the fingerprint value according to a predetermined rule, and in the changing of the component value of the Nth-order hash vector, only the sampled fingerprint values can be used to change the component values of the Nth-order hash vector.

8. The data hashing method of claim 1, wherein the hash value comprises a first hash value and a second hash value, wherein the first hash value is an interior angle $\theta$ or $\cos \theta$ between the Nth-order hash vector and an Nth-order base vector, and the second hash value is a distance D between an end point of the Nth-order hash vector and an end point of the Nth-order base vector or a scalar product between the Nth-order hash vector and the Nth-order base vector.

9. The data hashing method of claim 1, wherein the Nth-order hash vector is divided into m sub-hash vectors, and the hash value comprises a first M hash value and a second M hash value, each having m components, wherein the m components of the first M hash value are respectively interior angles $\theta_i$ or $\cos \theta_i$, i=1~m between the m sub-hash vectors and m base sub-vectors, each having the same order as a corresponding sub-hash vector, and the m components of the second M hash value are respectively distances $D_i$:i=1~m between end points of them sub-hash vectors and end points of the m base sub-vectors or scalar products between the m sub-hash vectors and the m base sub-vectors.

10. The data hashing method of claim 9, wherein the sum of the orders of the m sub-hash vectors is equal to or greater than N.

11. The data hashing method of claim 10, wherein each of the m sub-hash vectors is an Nth-order vector in which corresponding components of the Nth-order hash vector have the same components values of the Nth-order hash vector and the value of the other components is 0.

12. The data hashing method of claim 9, wherein multiple hash values, each having 2 m components, are generated for multiple computerized data, and the similarity between the multiple computerized data can be determined by respectively comparing 2 m components of a reference hash value with the 2 m components of each of multiple hash values, setting sub-weights inversely proportional to differences between the components, and summing all the sub-weights.

13. A data processing method using the SBH algorithm of claim 1, the data processing method comprising:

making a hash value table for a plurality of computerized data using the SBH algorithm; and processing the plurality of computerized data using the hash value table, wherein the plurality of computerized data is processed using at least one of comparison, search, classification, change, and similarity calculation of data, and can be processed within a time complexity of O(1), which is a constant, or O(n), which is proportional to the number n of data, by using the magnitude of a difference between hash values included in the hash value table.

14. The data processing method of claim 13, wherein if the plurality of computerized data is processed in order to search for data that is the same as or similar to data to be searched for, the processing of the plurality of computerized data comprises:

receiving the search data;

generating a hash value of the search data using the SBH algorithm; and searching for the same or similar data by indexing the hash value in the hash value table.

15. The data processing method of claim 14, wherein the generating of the hash value of the computerized data or search data comprises:

calculating a plurality of fingerprint values from the content of the computerized data or search data;

creating an Nth-order hash vector corresponding to the fingerprint values according to a predetermined rule; and converting the Nth-order hash vector into the hash value.

16. The data processing method of claim 15, wherein in the making of the hash value table, the hash values of the plurality of computerized data are generated, and in the searching for the same or similar data, data the same as or similar to the search data is found within a predetermined hash value difference range defined by a user by comparing the hash value of the search data to hash values of the plurality of computerized data.

17. The data processing method of claim 13, wherein the plurality of computerized data are packets transmitted through a network, and in the making of the hash value table, a hash value table for the packets is made, and in the processing of the plurality of computerized data, a rapid increase of packets that are the same as or similar to a specific packet can be monitored or blocked.

18. A data processing system using a computer-readable medium in association with a computing device which includes a processor and a memory, the computer readable medium including computer instructions which are configured to cause the computing device to perform a similarity-based hashing (SBH) algorithm, the data processing system comprising:

an inputting unit to which computerized data is input;

a hash value generator generating a hash value of the input computerized data using the SBH algorithm; and a data processing unit processing the computerized data using hash values, wherein the SBH algorithm further comprises:

calcuating a plurality of fingerprint values from the content of the computerized data;

creating an Nth-order hash vector corresponding to the fingerprint values according to a predetermined rule; and converting the Nth-order hash vector into the hash value, and wherein the computerized data are packets transmitted through a network, hash values corresponding to the packets are listed in a hash value table, and the data processing unit monitors or blocks a rapid increase of packets that are the same as or similar to a specific packet by checking whether the number of specific hash values or hash values that have a difference compared to the specific hash value within a predetermined range is greater than a threshold number.

19. The data processing system of claim 18, wherein the data processing system is a system for monitoring or controlling an illegal distribution of a digitized original document protected by copyright.

20. The data processing system of claim 18, wherein the data processing system is a document management system executing at least one of comparison, search, tracking, and classification functions for a plurality of documents.

21. The data processing system of claim 20, wherein the document management system is a concurrent versions system (CVS) which a plurality of users can use simultaneously.

22. The data processing system of claim 20, wherein the data processing system further comprises a data comparison and search unit using a same data comparison algorithm, wherein the data processing unit uses the SBH algorithm for a quick search for the same or similar data, and the same data comparison algorithm is used for a detailed comparison of the found same or similar data.

23. The data processing system of claim 22, wherein the same data comparison algorithm is a Legacy Comparison (LEG-CMP) algorithm comprising one of a diff tool, a Longest Common Subsequence (LCSeq) algorithm, and a Longest Common Substring (LCStr) algorithm.

* * * * *